Aug. 19, 1969  F. U. EVERHARD ET AL  3,461,727
GAS SAMPLER
Filed May 29, 1967  2 Sheets-Sheet 2

INVENTOR
FREDRIC U. EVERHARD &
ROBERT E. HARTWELL
BY *Susan Yaffee*
ATTORNEY

United States Patent Office 3,461,727
Patented Aug. 19, 1969

3,461,727
GAS SAMPLER
Frederic U. Everhard, Pelham, N.H., and Robert E. Hartwell, Chelmsford, Mass., assignors to RCA Corporation, a corporation of Delaware
Filed May 29, 1967, Ser. No. 642,108
Int. Cl. G01n 1/22
U.S. Cl. 73—421.5       4 Claims

ABSTRACT OF THE DISCLOSURE

A source of fluid which is to be collected for analysis is connected to a tube. The fluid is shunted from the tube into one or the other of two paths and back to the tube. A fluid collector is arranged in one path. Pump means are provided to prevent the described apparatus from applying back pressure to the source of fluid. The shunting of the fluid between the two paths is programmed to provide a sample in the fluid collector that is an average of the fluid produced by the fluid source over a period of time.

BACKGROUND OF THE INVENTION

This invention relates to a method of and an apparatus for collecting a sample of a fluid.

As a step in providing clean air, it is necessary to determine the amount of noxious components of gases exhausted into the atmosphere by the various sources of exhaust gases. One source of air pollutants is the exhaust gases from automobile engines. The composition of the exhaust gases from an automobile engine varies, however, with many parameters. Such parameters include the number of miles the engine has run, the care the engine has received, the operating temperature of the engine, the load on the engine, that is, is the engine idling or pulling. If pulling, is the engine running on a level road or is it running uphill or downhill. Also, is the engine accelerating or decelerating, and furthermore, what is the speed of the engine, or if the speed is changing what is the rate of change of the speed. Therefore, a sample of the exhaust gases produced by an engine at any one time is not a fair or representative sample of the exhaust gases produced by the engine in the normal everyday running of the automobile.

Assuming that an apparatus exists by which a fair sample of the exhaust gases of an engine as discussed above can be obtained, it would be possible to determine the normal limits of each pollutant provided by an engine that is in a reasonably good state of repair, and therefore, whether a particular engine being tested should be licensed for operation without requiring repairs. Also, by obtaining many fair samples of the exhaust gases from the same or similar engines using different fuels or oils, it can be determined what fuels or oils produce the least pollutants. Furthermore, a knowledge of the pollutants produced by differently designed engines can be helpful in designing an engine that produces a minimum amount of pollutants. In a similar manner, knowledge of the pollutants normally produced by other sources of exhaust fluids may be useful in so improving the other sources as to reduce the amount of pollutants produced thereby.

It is an object of this invention to provide an improved fluid sampling aparatus and method.

It is another object of this invention to provide a fluid sampling apparatus and method that will result in the accumulation in one container of fluid in a short time that is a fair sample of a fluid that varies in composition over a longer period of time.

According to this invention, a fluid to be sampled is caused to flow through a tube. Apparatus is provided for causing some of the fluid in the tube to flow through one or the other of two alternate shunt branches or paths in accordance with the position of a path shifting valve. The resistance to flow in the two paths is made substantially equal. A fluid accumulating apparatus is provided in one path. The valve is so operated, or so programmed to operate, as to cause samples of the fluid to flow into the accumulator apparatus for differing intervals of time, during different conditions of production of the fluid being sample, and in such a manner that when the sampling period is over, the fluid collected is a fair or representative sample of the integrated composition of this gas during the time that the fluid is being produced. If the fluid to be sampled is auto engine exhaust gas, the amount of gas collected when the engine is cold, will be programmed to be proportional to the amount of exhaust gas produced by engines when run cold in the normal use of automobiles. The amount of gas collected when the engine is accelerating is proportional to the amount of the exhaust gases produced by the engine when accelerating in the normal operation thereof. During the running of the engine in accordance with any desired parameter, the amount of exhaust gas collected will be proportional to the amount of the exhaust gas produced during the running of the engine in its normal operation, in accordance with that parameter. When the sampling period is over, the composition of the collected gas is a fair or representative sample of the exhaust gas produced by the engine under normal daily operating conditions. The accumulator may then be disconnected from the sampling apparatus and taken to a gas analysis laboratory. Another accumulator may be connected into the fluid sampler and another representative sample may be collected immediately from another engine and without waiting for the first sample to be analyzed.

BRIEF DESCRIPTION OF THE DRAWING

The invention may better understood when the following description thereof is read in connection with the accompanying drawing in which.

DESCRIPTION

Figure 1:
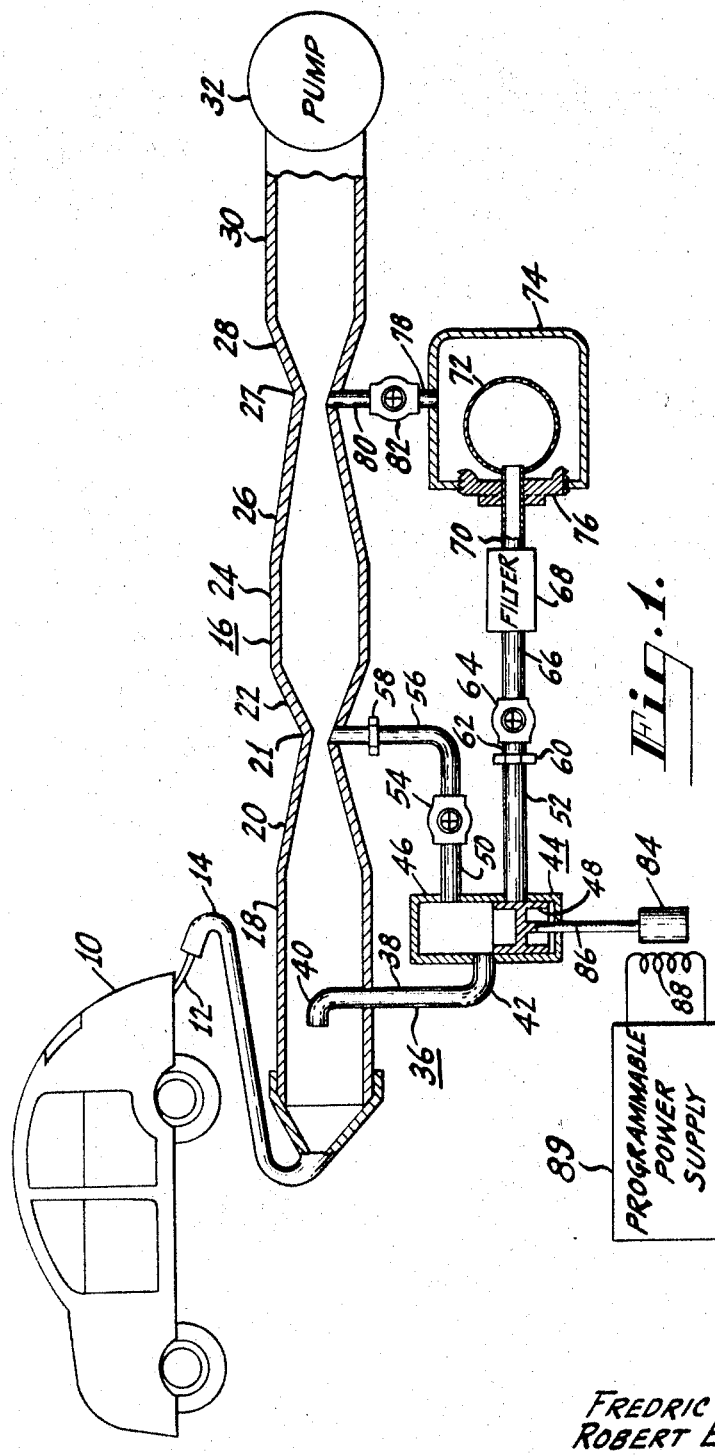
FIGURES 1 and 2 are a diagrammatic representation, partially in cross section, of apparatuses including this invention and with which the method of this invention may be performed.

FIGURE 1 illustrates the use of the herein described sampler to sample the exhaust fuel from an automobile 10. The gases from the exhaust or tail pipe 12 of the automobile 10 are fed into a connecting pipe 14. The gases that flow through the pipe 14 are fed into one end of a tube 16. The tube 16 includes a section 18 of uniform or unconstricted bore. The tube 16 also includes a section 20 of a conically reducing bore and a section 22 of a conically increasing bore providing a constricted or junction portion 21. The tube 16 further includes a second section 24 of uniform unconstricted bore, a second section 26 of conically reducing bore, a second section 28 of conically increasing bore meeting at a second constricted portion or junction 27 and a final section 30 of constant bore. The sections 18, 24 and 30 may be of the same bore. The sections 20 and 26 may be similar and the sections 22 and 28 may also be similar. The tube 16 feeds into an exhaust pump 32. However, the exhaust pump 32 provides suction only sufficient to overcome the friction to exhaust gas flow from the exhaust pipe 12 through the pipe 14 and through the tube 16, whereby the presence of the pipe 14 and the tube 16 does not change the back pressure on the engine of the automobile 10.

A sampling tube 36 comprises a central portion 38 and two end portions 40 and 42, that extend from the ends of the central portion 38 and in opposite directions. The axis of the end portion 40 is positioned coaxially with the axis of the tube portion 18, and the open end portion 40 extends towards the inlet end of the tube 16. The other end of the tube 36 is sealed into the wall of a moveable valve 44. The valve 44 comprises a hollow cylinder 46 which is closed at both ends and a moveable hollow piston 48. The outside surface of the piston 48 fits the cylinder 46 in an airtight manner. A pair of pipes 50 and 52 extend into the cylinder 44, the axes of the pipes 50 and 52 being parallel to the axis of the tube portion 42. The axes of the pipes 50 and 52 are equally and oppositely spaced from the axis of the tube portion 42. The piston 48 is moveable from a first position where the tube portion 42 feeds the pipe 50 by way of the cylinder 46 to a second position where the tube portion 42 feeds the pipe 52 by way of the cylinder 46. Therefore, in one position of the piston 48, gas entering the tube portion 40 is shunted into either one or the other of the two branch paths to be described, these branch paths comprising the pipes 50 and 52, and in the other position of the piston 48, the gases are shunted into the other of the branch paths comprising the pipes 50 and 52.

The other end of the pipe 50 is connected to an adjustable valve 54. An L shaped pipe 56 connects the other end of the adjustable valve 54 to the tube 16 at the junction 21. A pipe coupling or union 58 may be provided in making this connection if necessary.

The other end of the pipe 52 is connected by a pipe coupling or union 60 and a short piece of pipe 62 to a cut-off valve 64. The other end of this valve 64 is connected by means of a pipe 66 to a filter 68 which allows gas flow therethrough but stops solid material. The filter 68 is connected by a pipe 70 to a gas collecting means such as a flaccid nonporous bag 72 of a thin plastic material such as "Teflon" which is contained in a chamber 74. The bag 72 when empty is substantially flat and as it fills out it takes a balloon-like form. In the process of filling out, the bag 72 does not provide a substantial back pressure. An airtight plug 76 surrounds the pipe 70 and seals a wall of the chamber 74. The bag 72, the filter 68, the valve 64 and the connecting pipes comprise a gas accumulator. The chamber 74 is connected by way of two pipes 78 and 80 and an intervening valve 82 to the junction 27.

The suction produced by the pump 32 is adjusted so that there is no change in gas flow through the tube 16 from the exhaust pipe 12 due to the resistance provided by the pipe 14 and the tube 16. Due to the position of the tube portion 40 and due to the low pressure developed at the constricted junctions 21 and 27, gases are shunted from the tube 16 and flow through the two branches comprising the pipes 50 and 52 and back to the tube 16 at the junctions 21 and 27, respectively. With the shut-off valve 64 wide open, the two adjustable valves 54 and 82 are so adjusted that the gases flowing through the tube 36 to the junction 21 and the gas flowing through the tube 36 to the junction 27 are equal when the position of the valve 44 permits flow to these junctions. Therefore, there is a minimum of disturbance of flow in the tube 16 when the valve is operated to change the flow of gas through the tube 36 from one of the junctions 21 or 27 to the other thereof, whereby change of the position of the valve does not disturb the validity of the sample taken by the bag 72.

The valve piston 48 can be moved by a magnetic armature 84 that is connected to the piston 48 by a rod 86, the armature 84 itself being moveable by a solenoid 88, whose energization can be programmed by a suitable programmable power supply 89 in a manner to provide the proper sampling of the gas flow from the engine of the car 10.

The method of operation of the apparatus of FIGURE 1 is as follows:

When the engine of the automobile 10, which is on a test stand, is running in one of its test modes, that is, cold, idling, hot, accelerating, decelerating and so on, the valve 44 is shifted as by the energization of the solenoid 88 from the position shown in which all the gases entering the tube 36 exit at the junction 21 to a position in which the gases flowing into the tube 36 flow through the filter 68 and into the bag 72. As the bag 72 enlarges, the gases in the chamber 74, but outside of the bag 72, flow into the junction 27. Exhaust gases are accumulated in the bag 72 during this mode of operation of the engine in such amount so that the ratio of the gases accumulated in the bag when the motor is operating in this mode to the amount of gas accumulated in the bag over the entire sampling period is equal to the ratio of the time that the engine of the automobile will run in this mode in its normal use to the total time of running thereof in normal operation of the engine. The mode of operation of the engine is changed and the amount of exhaust gas resulting from the changed mode of the running of the engine is added to the gases in the bag 72, the added amount being again proportional to the ratio of the length of time the engine will be run, in its normal use, in this changed manner to the total running time of the engine in its normal use. This collecting of added samples of gases into the bag 72 is continued until the sampling period is complete, at which time the gas contained in the bag 72 is a fair or representative sample of the exhaust gases produced by the car 10 during its normal operation even though the exhaust gases are collected in a short time and while the car 10 is on a test stand. The energization of the solenoid 88 may be programmed to operate the valve 44 in any manner desired to cause this collection of gases, however, it is preferred to program the solenoid 88 to cause the valve 44 to operate several times during each mode of operation of the engine whereby the total time during which the valve 44 is in the gas collection position for each mode of operation is broken up into discrete portions. The increments of fluids collected by the described apparatus are selected in a weighted manner. The fluids collected at discrete intervals are so weighted that the aggregate of the collected fluids is a fair or representative sample of the fluid flow over a period of time during which the fluid is varying in composition.

When the test period is over, the tube 16 and valve 44 and its connections may be used to test another engine immediately. That is, the valve 64 is closed and the accumulator is removed by opening the pipe union 60 and the airtight plug 76 is disconnected from the chamber 74. Another accumulator unit comprising another valve 64, another filter 68 and another bag 72 with connecting pipes and parts are substituted for the removed accumulator. The disconnected accumulator comprising the bag 72 and the filter 68 and connecting parts may be taken to a convenient place for gas analysis while the tube 16 with another accumulator inserted is used to gather gas samples from another engine.

Figure 2:
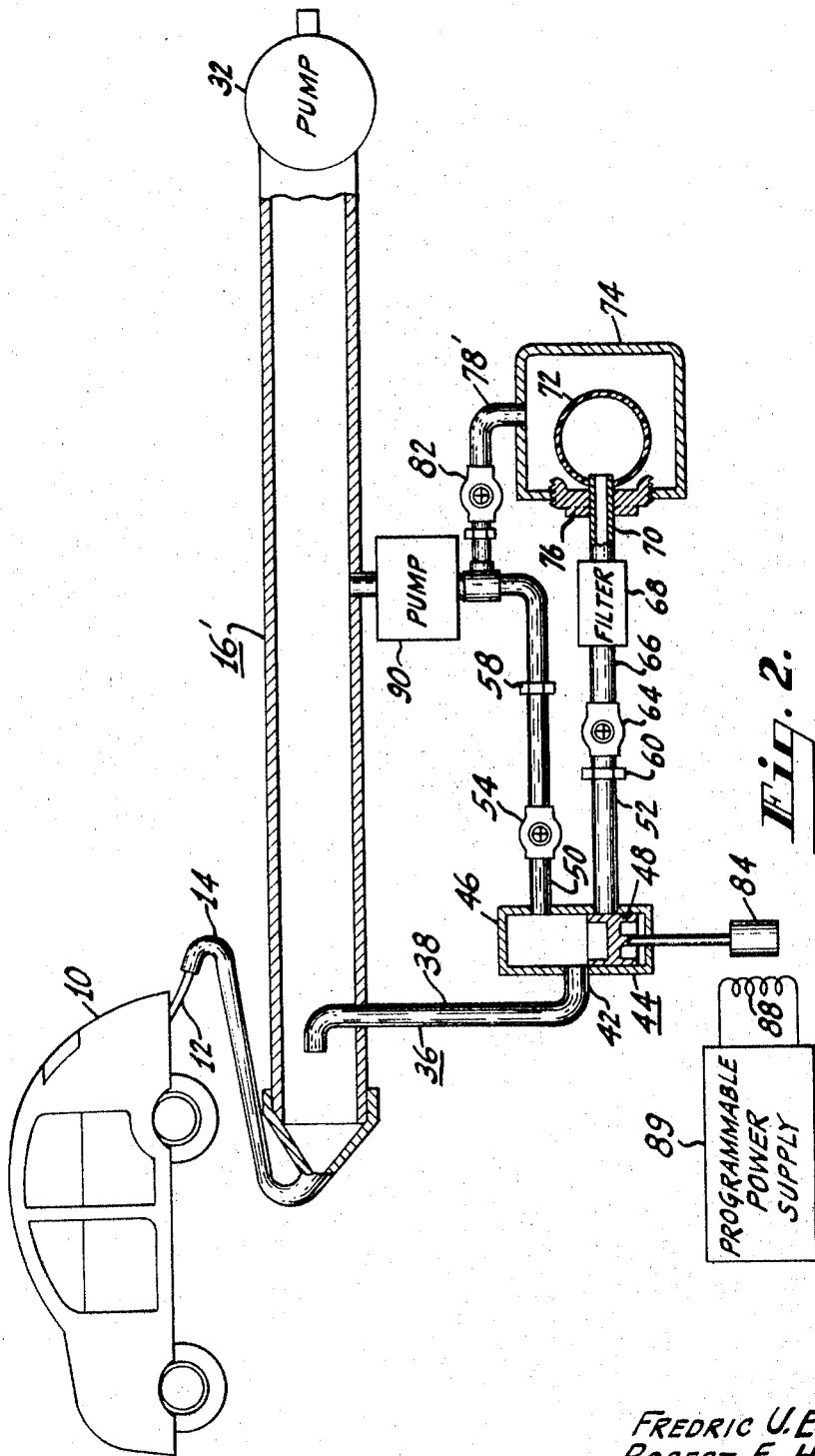

FIGURE 2 illustrates a modified apparatus for collecting fluid samples. The elements of FIGURES 1 and 2 which are the same have been given the same reference characters. FIGURE 2 differs from FIGURE 1 in that there are no constricted portions of the tube 16' in FIGURE 2 for providing points of low pressure for exhaust of the branches leading from the valve 44 to the tube 16'. Instead of using constricted portions in FIGURE 2, a pump 90 is provided between the pipe 50 and the tube 16'. The tube 78' leading from the chamber 74 in FIGURE 2 also feeds into the pump 90. As in FIGURE 1, the flow of fluids in the branches comprising the pipes 50 and 52 are equalized by adjusting flow control valves 54 and 82. Due to the similarity of FIGURES 1 and 2, no further explanation of the apparatus of FIGURE 2 or of the method of operation thereof appears necessary.

While in FIGURE 1, the two branches comprising the pipes 50 and 52 are shown as feeding into individual constrictions 21 and 27, if desired, the outlet pipes 80 and 56 may be joined to a single pipe (not shown) which may feed into one constriction 21 or 27, in which case the other constriction may be omitted.

Many modifications of the described invention may be made by one skilled in the art. For example, while this apparatus has been described in gathering gases from an automobile exhaust, this apparatus may be used to collect fluids from any source of fluids such as smoke stack gases, sewage discharges, water purification outlets, gas and oil pipelines, which it is desired to sample. The above description and accompanying drawing are therefore to be considered as illustrative and not in a limiting sense.

What is claimed is:

1. The method of collecting a representative sample of the exhaust gases produced by an internal combustion engine in the various modes of operation thereof comprising normal operation thereof, which comprises collecting portions of the exhaust gases produced by said engine during each of different ones of said modes of operation of said engine, the ratio of the volumes of the portions of gases collected during each mode of operation to the total volume of the gas collected being equal to the ratio of the normal running of the engine in each mode to the total running of the engine in the several modes during its normal use.

2. A gas sampling apparatus comprising a tube:
means for causing a gas to be sampled to flow through said tube,
means for deflecting gases flowing in said tube into a shunt path,
valve means for causing the gases which flow in the shunt path to go into either of two branch paths, one branch path having a gas collector means therein,
means for causing the flow of fluid in the two branch paths into said tube,
in which said means for causing flow of fluid in said branches comprises at least one constricted portion of said tube and in which a path extends to a constricted portion.

3. A gas sampling apparatus comprising a tube:
means for causing a gas to be sampled to flow through said tube,
means for deflecting gases flowing in said tube into a shunt path,
valve means for causing the gases which flow in the shunt path to go into either of two branch paths, one branch having a gas collector means therein,
means for causing the flow of fluid in the two branch paths into said tube,
said gas collector means including a bag within a chamber, said bag being connected in a gas collecting manner in said one branch and said chamber being connected to said tube.

4. The invention as expressed in claim 1 in which said branch which includes said bag also includes a filter between said valve and said bag.

References Cited

UNITED STATES PATENTS

| | | |
|---|---|---|
| 2,284,560 | 5/1942 | Corneil. |
| 2,322,018 | 6/1943 | Huber _____ 73—422 XR |
| 2,479,787 | 8/1949 | Stevens _____ 73—421.5 XR |
| 2,489,394 | 11/1949 | Austin _____ 73—421.5 |
| 2,608,866 | 9/1952 | Breedlove et al. _____ 73—422 |
| 3,372,274 | 3/1968 | Landolt _____ 73—421.5 XR |
| 3,382,721 | 5/1968 | Tinkham et al. _____ 73—421.5 |

LOUIS R. PRINCE, Primary Examiner

HARRY C. POST III, Assistant Examiner

UNITED STATES PATENT OFFICE
CERTIFICATE OF CORRECTION

Patent No. 3,461,727                          August 19, 1969

Fredric U. Everhard et al.

It is certified that error appears in the above identified patent and that said Letters Patent are hereby corrected as shown below:

In the headnote, column 1, the name Frederic U. Everhard should appear as Fredric U. Everhard.

Signed and sealed this 23rd day of December 1969.

(SEAL)
Attest:

Edward M. Fletcher, Jr.                      WILLIAM E. SCHUYLER, JR.
Attesting Officer                              Commissioner of Patents